Jan. 10, 1967   A. COUTTS ET AL   3,297,358
CONVERTIBLE CAR SEAT AND BED FOR A CHILD
Filed Aug. 16, 1965   4 Sheets-Sheet 1
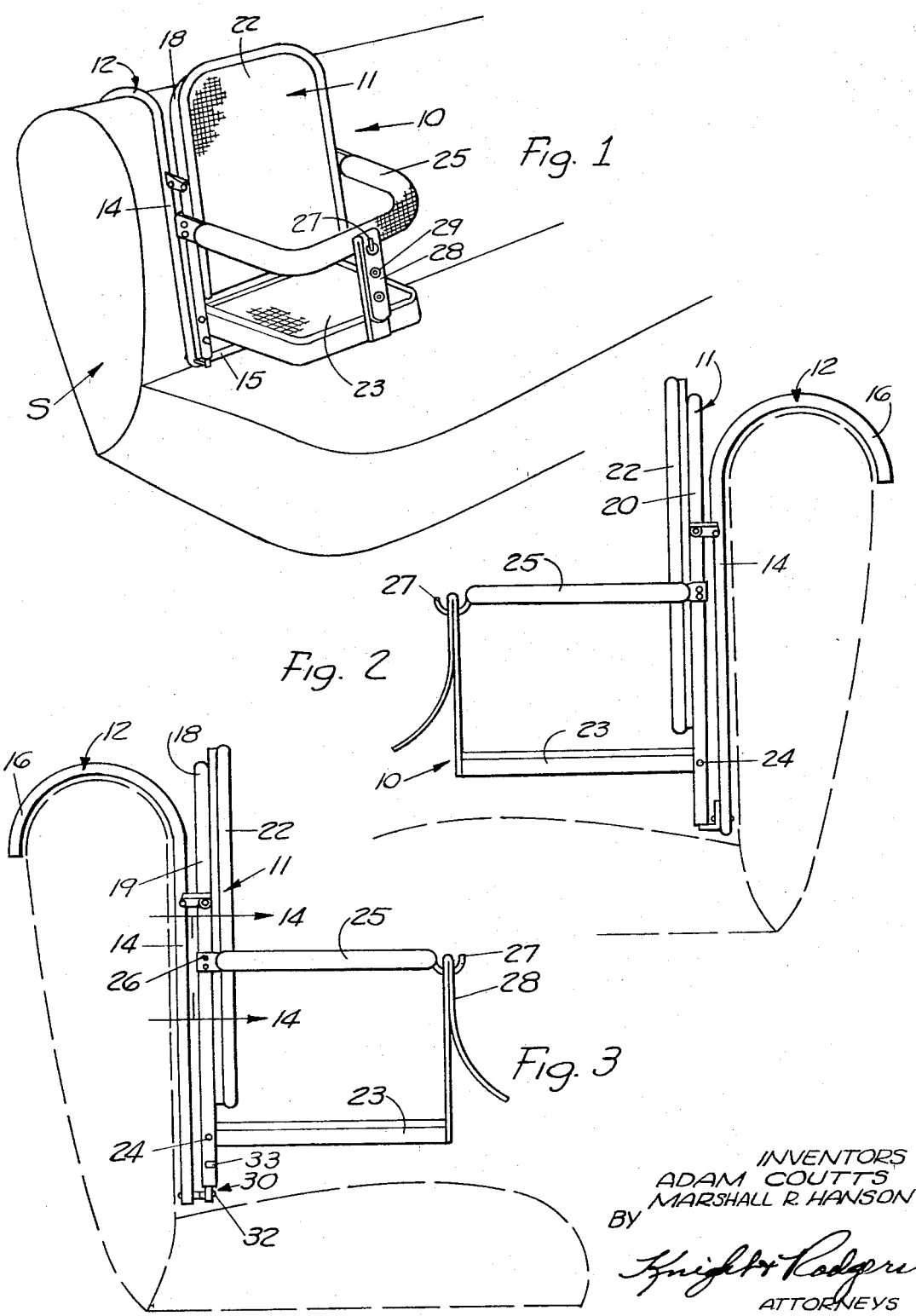
INVENTORS
ADAM COUTTS
MARSHALL R. HANSON
BY
Knight & Rodgers
ATTORNEYS

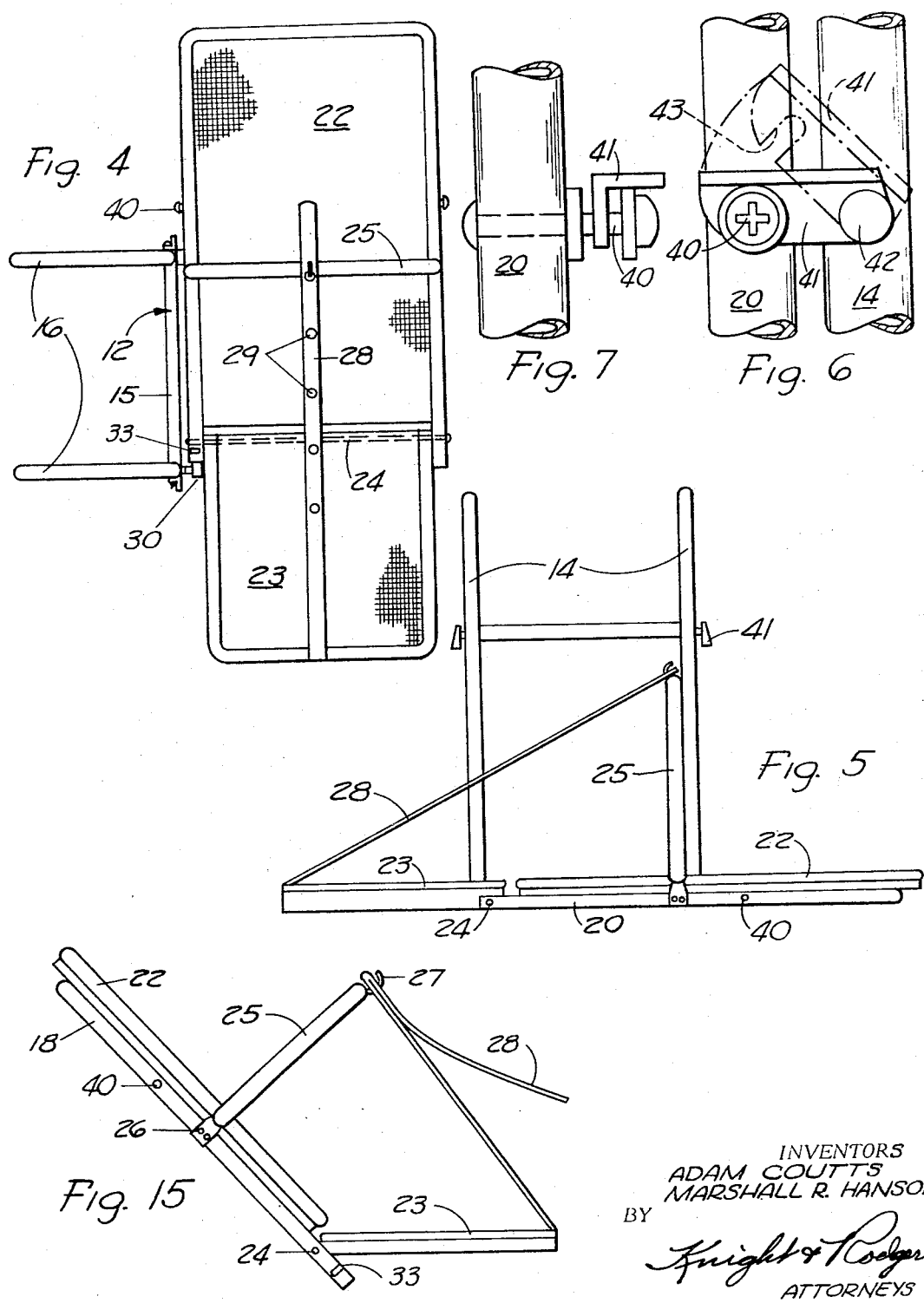

Jan. 10, 1967    A. COUTTS ETAL    3,297,358
CONVERTIBLE CAR SEAT AND BED FOR A CHILD
Filed Aug. 16, 1965    4 Sheets-Sheet 3
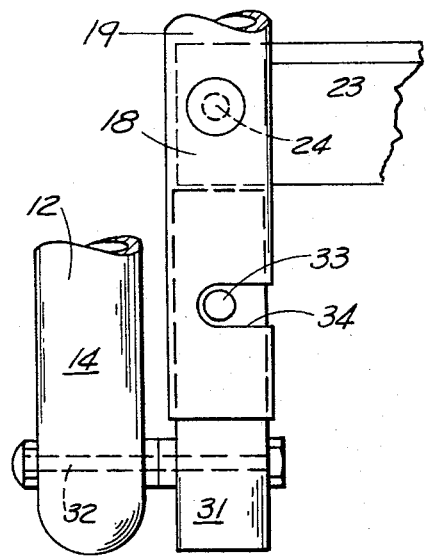
Fig. 8
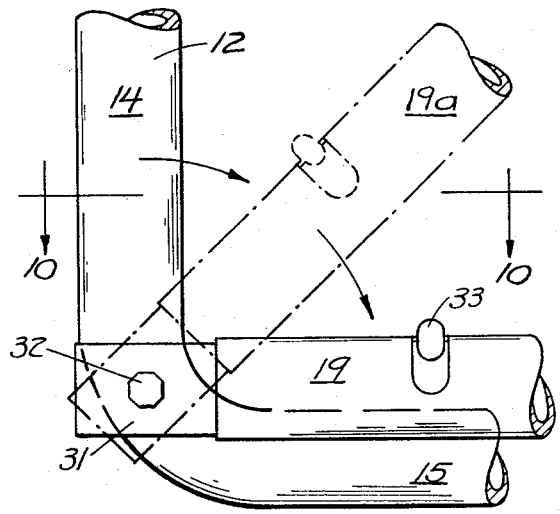
Fig. 9
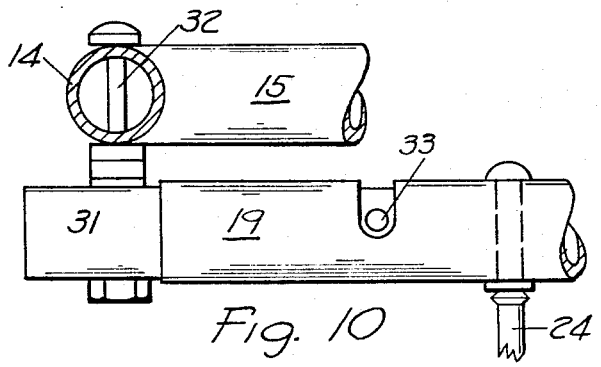
Fig. 10
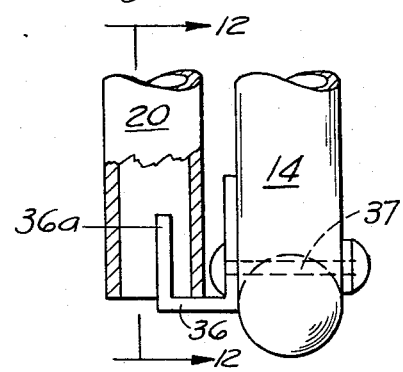
Fig. 11
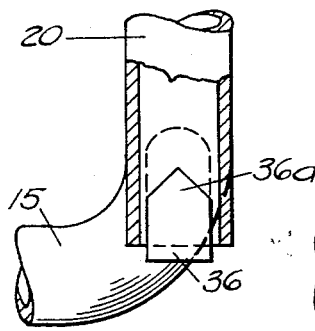
Fig. 12
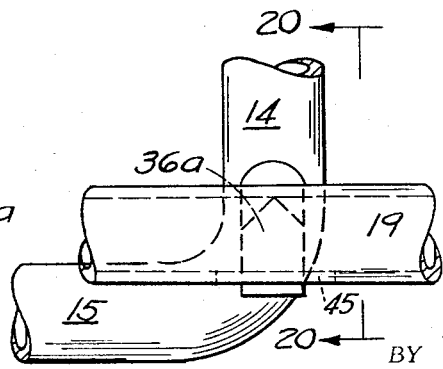
Fig. 13
Fig. 14
INVENTORS
ADAM COUTTS
MARSHALL R. HANSON
BY
Knight & Rodgers
ATTORNEYS

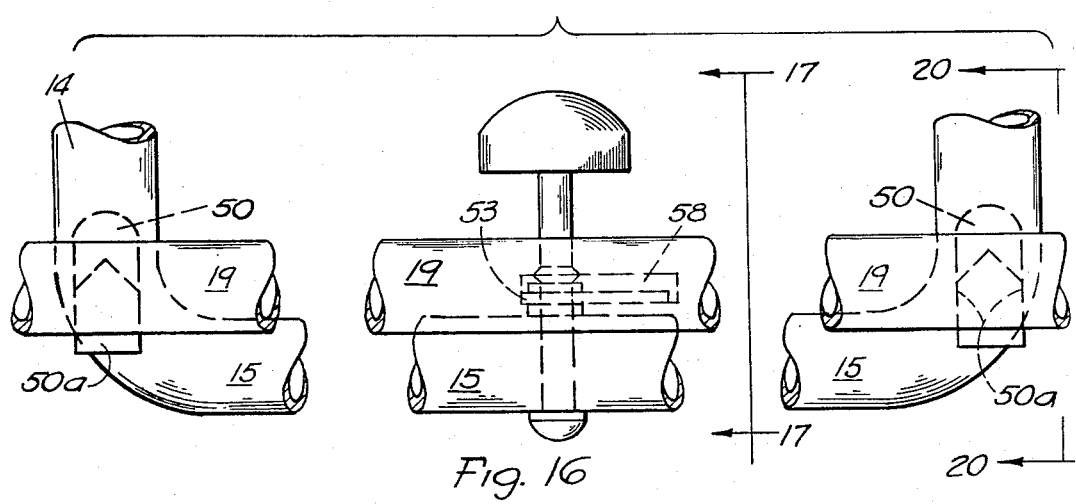
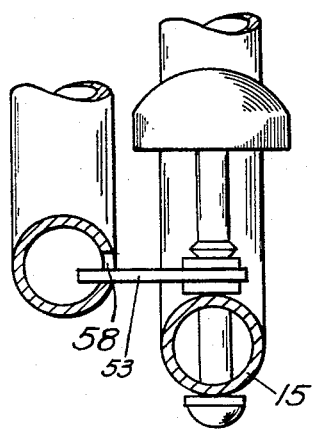
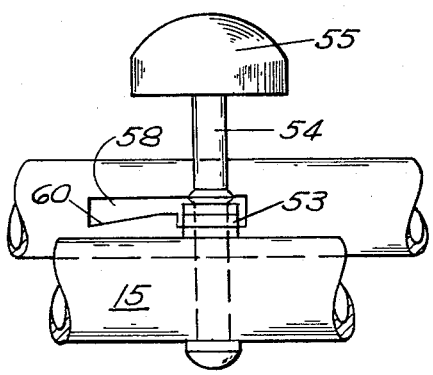
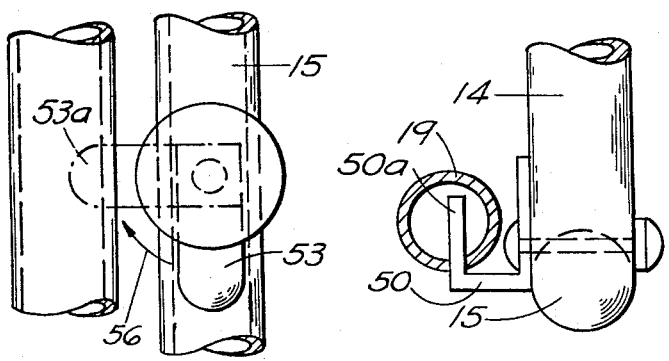

United States Patent Office 3,297,358
Patented Jan. 10, 1967

3,297,358
CONVERTIBLE CAR SEAT AND BED FOR A CHILD
Adam Coutts, 914 24th St., Santa Monica, Calif. 90403, and Marshall R. Hanson, Northridge, Calif. (2351 Rosado Way, Rancho Cordova, Calif. 95670)
Filed Aug. 16, 1965, Ser. No. 479,819
8 Claims. (Cl. 297—118)

The present invention relates generally to children's furniture of the class including auxiliary seats for infants and small children, which seats are fastened to or mounted upon the front seat of an automobile or similar vehicle; and more especially to a novel design for an article of this character which converts from a seat to a bed or carrier for a child and thereby permits various uses for a single structure.

It is well known to provide small auxiliary seats for children riding in an automobile. Usually the child's seat is fastened to the upright back portion of the front seat of the vehicle, providing a seat for the child at some elevation above the level at which an adult sits. This has the advantage of raising the child high enough so that it can see out of the automobile windows, thus adding to the comfort of the child when riding. Seats also are designed to hold the child safely against the forces of sudden turns or quick stops which might otherwise throw the child against hard portions of the vehicle with the possibility of injury.

Known types of child's car seats have all been of rigid construction which lend themselves only to the single use in the vehicle of holding the child upright in a sitting position. They have, by their rigid structure, limited their usefulness to the single situation.

Thus, it becomes a general object of the present invention to provide a novel construction for a child's car seat that permits conversion to a bed and gives greater flexibility and utility to the seat by permitting its use in other ways than to hold the child sitting upright and permits its use outside of the car with the child.

More particularly, it is an object of the present invention to provide a child's car seat which is convertible from a seat to a bed or the like which holds the child in a reclining position in which it can rest or sleep in or out of the vehicle and yet is held securely against horizontal or lateral movements to safeguard the child against injury.

It is a further object of the present invention to provide a novel design for a child's car seat having a seat portion receiving the child which is convertible to a carrier for the child in a semi-reclining position, giving to the same car seat or a portion thereof a utility in carrying the child outside the vehicle.

These objects of the present invention are achieved by providing a convertible car seat and bed for a child comprising two principal portions, a seat structure having a seat and a backrest for the child, and a mounting frame which includes means for attaching the frame to the upright back portion of the vehicle seat. Separable means are provided for securing the seat structure to the mounting frame in either one of two positions. One position is an upright position to accommodate the child while sitting up; while the other position is one securing the seat structure to the mounting frame with the seat structure converted into a bed-like arrangement in a reclining position with the child lying down, this arrangement being made possible by means including a pivotal connection between the seat and the backrest of the seat structure.

Various types of means are contemplated for connecting together the seat structure and the mounting frame, a preferred embodiment of such means including a swing joint which permits relative rotational movement of the seat structure as a whole about two axes without disturbing the mounting frame, thus allowing the seat structure to be moved between the upright and reclining position without entirely disengaging it from the mounting frame. In addition to the swing joint, means are provided on the frame for engaging the seat structure at two different locations on the seat structure, according to the position of the seat structure, to hold the seat in each of said positions against forward or lateral displacement with respect to the mounting frame so that the child is at all times held securely.

In a variational embodiment of the invention, the swing joint may be omitted and other connecting bracket means substituted which, preferably, in combination with suitable clamp or hold-down devices, hold the seat structure and the mounting frame engaged in either one of the two major positions just mentioned.

How these objects and advantages of the invention, as well as others not specifically referred to herein, are achieved, will be more readily apparent by reference to the following description and to the annexed drawing, in which:

FIG. 1 is a perspective view of a convertible child's car seat embodying the present invention in its upright position and attached to the backrest portion of a vehicle seat.

FIG. 2 is a side elevation of the child's seat taken from the right of FIG. 1.

FIG. 3 is a side elevation of the child's seat taken from the left of FIG. 1.

FIG. 4 is a plan view of the entire child's car seat with the seat structure still attached to the mounting frame and moved into the reclining position to convert to a bed.

FIG. 5 is a side elevation of the child's car seat in the position illustrated in FIG. 4.

FIG. 6 is an enlarged fragmentary side elevation of a portion of the frame as seen in FIG. 2 showing releasable latch means connecting the seat portion to the mounting frame.

FIG. 7 is a fragmentary front elevation of the latch means viewed from the left of FIG. 6.

FIG. 8 is an enlarged fragmentary side elevation of the swing joint at the lower corner of the car seat, viewed as in FIG. 3.

FIG. 9 is an enlarged fragmentary front elevation of a portion of the structural framework of the child's car seat showing the swing joint as viewed from the right of FIG. 8 with the seat structure in the reclining position.

FIG. 10 is a combined horizontal section and fragmentary plan on line 10–10 of FIG. 9.

FIG. 11 is a fragmentary section and side elevation taken at the lower corner of the child's car seat as viewed in FIG. 2 illustrating one type of fixed bracket for interconnecting the seat structure and the mounting frame.

FIG. 12 is a fragmentary vertical section on line 12—12 of FIG. 11.

FIG. 13 is a fragmentary view similar to FIG. 12 with the seat structure in the reclining position engaging the bracket on the mounting frame.

FIG. 14 is an enlarged fragmentary vertical section on line 14—14 of FIG. 3.

FIG. 15 is a side elevation of the seat structure detached from the mounting frame with the seat thereof in a position to provide a carrier for the child to be carried manually.

FIG. 16 is a fragmentary front elevation of structural framework elements only illustrating a variational form of the invention.

FIG. 17 is a fragmentary vertical section on line 17—17 of FIG. 16.

FIG. 18 is fragmentary rear elevation of a central portion of the frame members of FIG. 16 showing a securing means.

FIG. 19 is a fragmentary plan view of the securing means of FIG. 16.

FIG. 20 is a vertical section on line 20—20 of FIG. 16.

Referring now to the drawing, and particularly to FIG. 1, there is shown therein a convertible car seat for a child constructed according to the present invention and in place on the upright back portion of a vehicle seat S. The convertible child's car seat indicated generally at 10 comprises two principal parts, a seat structure, indicated generally at 11, and a mounting frame, indicated generally at 12, by means of which the seat structure is supported and mounted upon the upright back of the vehicle seat. These two principal portions of the convertible car seat are interconnected by separable means which will be described in detail.

Mounting frame 12 may be made in a large part, if desired, from a single piece of metal tubing bent to the desired configuration. For this purpose, aluminum tubing is highly satisfactory; although it will be realized that the invention is not necessarily limited thereto and other materials or manufacturing operations may be used instead. However, for sake of disclosure, the mounting frame 12 is assumed to be made from a length of metal tubing bent into a generally U-shaped configuration providing a pair of vertically extending side rails 14 which are preferably parallel to each other and which are interconnected at their lower ends by a horizontally extending bottom rail 15. Each of side rails 14 terminates at its upper end in a hook 16 of a size and shape designed to pass over the top edge of the upright back of the vehicle seat S for the purpose of mounting the child's car seat 10 in place and supporting the weight thereof entirely on the back of the vehicle seat S.

The seat structure 11 is likewise preferably made from bent aluminum tubing; but here again, a wide range of other materials is available for the choice of the designer. Seat structure 11 has a U-shaped fame member 18 which has a pair of parallel, vertically extending side rails 19 and 20 interconnected at their upper ends by a horizontally extending portion of the frame, rails 19 and 20 preferably being spaced apart by the same distance as the two side rails 14 of mounting frame 12, for reasons which will become apparent.

Frame 18 provides a backrest for seat structure 11 and, to enhance the comfort of the child, is provided with a padded back support 22 which spans the distance between, and is attached to, the two side rails 19 and 20 of the seat structure. This padded portion 22 may be of any type desired; but is here shown as upholstered with a rolled edge.

Seat portion 23 of the seat structure 11 is pivotally connected to the two side rails 19 and 20, as by rod 24 which passes through and extends between both the frame rails 19 and 20 and through the rear portion of the seat, to establish a generally horizontal axis about which seat 23 can swing with respect to the backrest of the seat structure. Seat 23 may also be padded in the same manner as backrest 22.

Another U-shaped tube 25, suitably padded on the exterior, has the ends of the U-shape rigidly connected at 26 to frame elements 19 and 20 as shown in FIGS. 2 and 3, respectively. Tube 25 provides an armrest and guard rail for the child sitting on seat 23 and is appropriately positioned and sized for this purpose.

The rigid rail 25 also serves another purpose when it is provided at its forward side with hook 27 or similar means to which can be attached strap 28, one end of which is attached to the forward edge of seat 23. Strap 28 is provided with a plurality of eyelets 29, shown best in FIG. 4, into which hook 27 can be inserted. In this way, strap 28 serves as a means to support from armrest 25 the forward edge of the pivotally mounted seat 23 when the child is sitting upright in the position of FIGS. 2 and 3. By removing the hook 27 from the eyelets in the strap, seat 23 is free to swing about pivot 24 in a clockwise direction, as viewed in FIG. 3, in order to place the seat in substantial prolongation of back 22, thereby converting the seat structure to a bed-like structure, as shown in FIG. 4.

While they are separable under certain conditions, as will be described, the seat structure 11 and support frame 12 therefor, are provided with suitable interconnecting means for securing the seat structure in place when in use in a vehicle. The interconnecting means are characterized by having separable elements which permit the seat structure to be removed or detached from the mounting frame so that it can be used separately. In the event that it is decided to forego the separate use of the seat structure, hereinafter described, it will be realized that the interconnecting means may be modified accordingly.

Such interconnecting means includes a swing joint or hinge means indicated generally at 30 in FIG. 3 and shown in greater detail in FIGS. 8, 9 and 10. This swing joint is designed to give two degrees of freedom of movement of the seat structure relative to the mounting frame and generally speaking, any type of universal joint that provides this freedom of relative movement is satisfactory for the purpose intended. As illustrative of such swing joints but not necessarily limiting the invention thereto, it will be seen in FIG. 8 that the swing joint comprises a short pin 31 inserted in the open lower end of side rail 19 of the seat structure frame and pivotally connected to support frame 12 by bolt 32 or other suitable pivot means. The external diameter of pin 31 is substantially the same as the internal diameter of the tubing of rail 19, allowing the rail to pivot about its axis relative to pin 31. However, axial movement of the two members is necessarily limited by some suitable latch means, such as pin 33 extending transversely of pin 31. Pin 33 may be spring-urged to an outward position so that it can be manually depressed into pin 31 to permit rail 19 and pin 31 to be separated by relative axial movement. A slot 34 in the wall of tubing 19 has an arcuate length of something in excess of 90° so that the seat structure can be rotated for at least 90° around pin 31. The length of slot 34 may be changed if desired to provide more or less angular motion. In addition to this movement around the axis of tubing 19, it will be appreciated that the seat structure can be rotated freely relative to support frame 12 about the axis of pivot 32.

As will be evident from later description, the swing joint just described not only transfers the weight of seat structure 10 and the child therein to support frame 12, but also provides the possibility of certain relative movement between these two principal elements of the car seat without necessarily breaking the engagement between the two components and consequently without interruption in its weight-supporting function.

The aforementioned interconnecting means also includes a fixed bracket 36 as shown particularly in FIGS. 11 and 12. This bracket may take any desired shape but conveniently is a U-shaped member, one leg of which is attached directly to side rail 14 of the support frame by means of rivet 37, or any other suitable means. The other leg 36a of bracket 36 extends upwardly into the open lower end of side rail 20 of the frame of the seat structure in order to support the seat structure at this location and transfer to frame 12 a portion of the weight of the seat and the infant therein. It will be seen that the bracket and frame rail 20 are held in engagement by gravity, the weight of the seat structure being in a direction to maintain this engagement; and, conversely, the two members are separated by relative upward movement of the seat structure.

Since swing joint 30 and bracket 36 engages the seat structure at the lower ends of the frame, there is a need for means restraining the seat structure from rotating forward about the interconnecting means described. Such restraint is provided by latch means which may be provided at one or both sides of the car seat. While any suitable latch means may be used, a typical form thereof is shown particularly in FIGS. 6 and 7. The latch comprises a fixed pin 40 mounted in rail 20 of the seat structure and keeper 41 pivotally attached by rivet 42 to side rail 14 of the supporting frame. A slot 43 in the keeper bar receives pin 40 when the keeper is lowered to the full line position of FIG. 6, thus holding the seat structure and the supporting frame in the position shown. By raising the keeper to the dotted line position, the seat structure 11 is free for conversion to a bed-like structure, as will be described. It will be realized that it is also satisfactory to locate the latch means at other positions.

Having described a preferred embodiment of the present invention, its uses will now be mentioned. One use is that which it has in common with known types of car seats, which is to hold a sitting child. For this purpose, the seat structure 11 is mounted upon frame 12 in the position shown in FIGS. 1, 2 and 3, which may be termed the upright position of the seat structure. Here a child can sit upon seat 23 and lean back against backrest 22. The weight of the seat structure and of the child is carried to the mounting frame through swing joint 30 and bracket 36 while the two latches 41 hold the upper portion of the seat structure from tilting forward.

A second use of the car seat is to convert it to a bed upon which the child can recline, either to rest or to sleep. This is accomplished by releasing the latch means 41 and lifting one corner of the car seat sufficiently to disengage side rail 20 from angle bracket 36. This motion is made possible by the construction of swing joint 30.

Now the seat structure is connected to the mounting frame only through the swing joint; and it is not necessary for this next movement that the swing joint be completely disengaged. The seat structure is first rotated for approximately a quarter turn about an upright axis established by pin 32. This last motion brings the backrest of the seat structure from an upright position into a generally horizontal position as shown in FIG. 4. In this position, side rail 19 of the seat structure is engaged with the hook portion 36a of support bracket 36. To permit this, slot 45 (FIG. 14) is cut in side rail 19 at such a position that the forward upwardly extending portion 36a of bracket 36 can be inserted in slot 45 when the parts are in the relative positions shown in FIG. 13.

The nature of swing joint 30 and the engagement between side rail 19 and bracket 36 are such that these two means for interconnecting the seat structure and the supporting frame permit the seat structure to rock through a limited arc about a generally horizontal axis established by the swing joint and bracket 36. Thus, the weight of the seat structure and the child thereon is now supported chiefly by the forwardly extending seat portion of the vehicle seat S. However, the connection between the seat structure and the mounting frame is such as to hold the seat structure and the child therein against shifting horizontally, either forward or sideward, on the vehicle seat, as a result of making sharp turns or sudden stops. The child is further held safely on the bed by the guard rail 25 and strap 28.

Of course, in this reclining position, the seat 23 is rotated about pivot 24 to place it substantially in extension of backrest 22 as shown in FIGS. 4 and 5. To permit this, strap 28 is engaged with hook 27 in one of the eyelets near the end of the strap, as shown in FIG. 5; although actually the strap need not be attached to hook 27 on the guardrail if not wanted.

Use as a bed in the vehicle has been described. It will be obvious therefrom that the bed can also be used outside of the car when the structure 11 is detached from frame 12 as described below. It has the advantage that the bed can be placed on any surface and the child is secure in the bed.

A third use of the convertible car seat is to provide a carrier for a child so that it can be carried comfortably in the parent's arms. To do this, the car seat is completely detached from support frame 12. This is accomplished by releasing the latches 41 and disengaging bracket 36 from side rail 20 as previously described. Finally, swing joint 30 is disengaged. This is done by depressing pin 33 in pin 31, allowing pin 31 to be withdrawn from the lower open end of side rail 19. The detached seat structure now has a separate utility as a carrier or bed for the child. To facilitate its use in this capacity as a carrier and to add to the comfort of the child, seat 23 may be swung pivotally to some such position as shown in FIG. 15 in which it makes an angle greater than 90° with backrest 22, allowing the child to be carried in a reclining position, although not lying down flat. To hold the seat in this position with the weight of the child resting on the seat and the backrest, strap 28 is engaged with hook 27 in an appropriate eyelet in the strap.

The construction described above with the swing joint 30 is preferred because the swing joint provides at all times a positive interconnection between the seat structure and the support frame until deliberate action is taken to disengage the seat structure from the support frame. However, it will be understood that a simplified arrangement can be made, as illustrated in FIGS. 16-20, embodying a variational form of the means interconnecting the seat structure and the support frame. The variational means comprises two bracket means, each similar to bracket 36, modified by the addition thereto of separate means for holding the car seat against disengagement from the brackets either by movement of the child or by up and down vibration caused by driving over a bumpy road. Such simplified embodiment of the invention will now be described.

FIG. 16 shows only the essential framework elements of the car seat and the means interconnecting the mounting frame and the seat structure of the simplified embodiment of the invention when the seat structure is placed in the reclining position corresponding to that shown in FIGS. 4 and 5. This embodiment of the invention is the same as previously described except for the changes particularly pointed out below.

Mounting frame 12 is provided with two similar angle brackets 50, each of general U-shape and connected at one leg to the frame of the mounting frame, as is bracket 36. Each bracket 50 has an upstanding leg 50a which is adapted to enter into the open lower end of the respective side rails 19 and 20 of the seat structure when in the upright position to support the weight of the child and the seat structure on the mounting frame, in the same manner as shown in FIG. 12 and as previously described in connection with bracket 36. Thus, when the child is sitting upright in the seat structure, the seat structure and the mounting frame are held in engagement by gravity together with the restraint imposed by latches 41.

When it is desired to convert the car seat to a bed for the child to lie upon, the seat structure is lifted bodily out of engagement with the two brackets 50, after releasing latches 41. Because of the nature of the interconnecting means at 50, the seat structure and the mounting frame are completely disengaged by simply raising the seat structure upwardly.

The disengaged seat structure can now be moved into the reclining position by rotating it for substantially 99°, more or less, about two mutually perpendicular axes as mentioned before, although these axes are not fixed or established by the mounting frame or any connection thereto, as previously described. Side rail 19 of the seat structure is provided with two spaced slots 51. One of these slots is shown in FIG. 20. The two slots are properly spaced along rail 19 to each receive one of the upstanding bracket legs 50a as shown in FIG 20. The interconnection thus effected between the seat structure and the supporting frame allows the weight of the seat and the infant to be supported chiefly upon the forwardly extending horizontal portion of the vehicle seat S, while the support frame still restrains the seat structure against any horizontal movement. In this way, the infant is held safely on the vehicle seat.

In the previously described embodiment, the swing joint always effected a positive connection between the mounting frame and the seat structure, whereas the interconnecting means as just described does not perform that function. Accordingly, it is preferred to add to the convertible car seat means illustrated in FIGS. 16–19 for restraining the seat structure against upward motion which would cause it to disengage the bracket arms 50a. This securing means comprises a blade 53 nonrotatably mounted upon pivot 54 which is rotatably mounted in the lower frame member 15 of the support frame. Pivot 54 is provided at its upper end with knob 55 by means of which the pivot can be rotated through approximately 90°, at least, in order to move the blade between locking and release positions.

When the blade is parallel to support frame member 15 as shown in solid lines in FIG. 19, it does not engage the seat structure. However, when the blade is moved 90° clockwise as indicated by arrow 56 in FIG. 19, it is moved into the dotted line position 53a and engages side rail 19, as by entering slot 58 cut in the side rail at a suitable position to receive the blade.

Blade 53 is preferably elastic. The lower edge of slot 58 is provided with a ramp that is shorter than slot 58, as indicated at 60 in FIG. 18. Blade 53 can deflect upwardly enough to allow it to ride up over the ramp and then drops down at the end of the ramp to be held between the end of slot 58 and the end of ramp 60 against rotational movement which would permit it to disengage accidentally the rail member 19.

When blade 53 is engaged in slot 58 as shown in FIGS. 17 and 18, the seat structure is held against upward movement which would tend to disengage it from brackets 50a.

From the foregoing description, it will be apparent that various changes in the detailed structure and arrangement of the parts of our improved car seat for a child may occur to persons skilled in the art without departing from the spirit and scope of the present invention. Accordingly, it is to be understood that the foregoing description is considered as being illustrative of, rather than limitative upon, the invention as defined by the appended claims.

We claim:

1. A convertible car seat and bed for a child, comprising in combination:
   a seat structure on which a child sits;
   a mounting frame for supporting the seat structure on a vehicle seat;
   and universal joint type of hinge means interconnecting the seat structure and the mounting frame to permit the entire seat structure to be rotated about two axes relative to the mounting frame without disconnecting the heat structure from the mounting frame at the hinge means.

2. A convertible car seat and bed as in claim 1 in which the hinge means includes a swing joint permitting all elements of the seat structure to rotate as a unit at least about 90° relative to the mounting frame around each of said two axes.

3. An adjustable car seat as in claim 1 in which the hinge means includes a pair of telescopically engaged members capable of rotation about a common axis and releasable latch means holding said members against relative axial movement until the latch is released.

4. The combination with a vehicle seat having an upright back portion and a generally horizontal seat portion, of a child's convertible seat and bed, including:
   a mounting frame removably attached to the back portion of the vehicle seat;
   and a seat structure for a child removably supported on the frame,
   said seat structure having a backrest, a seat portion pivotally connected to the last-mentioned brackrest, and means adjustably supporting the last-mentioned seat portion from and at an angle to the backrest of the seat structure to accommoate a child in a sitting position,
   the backrest and seat portions of the seat structure being movable to positions in which they rest upon and are supported by the vehicle seat portion and are engaged by the mounting frame to restrain them against horizontal movement relative to the vehicle seat.

5. The combination with a vehicle seat having an upright back portion and a generally horizontally seat portion, of a child's convertible seat and bed, including:
   a mounting frame removably attached to the back portion of the vehicle seat;
   a seat structure for a child removably supported on the frame;
   means securing the seat structure in upright position to the mounting frame with the weight of the seat structure fully supported by the mounting frame;
   and means securing the seat structure in a reclining position with the weight of the seat structure supported partially by the mounting frame and partially by the seat portion of the vehicle seat.

6. The combination with a vehicle seat having an upright back portion and a generally horizontal seat portion of a child's convertible seat and bed, including:
   a mounting frame removably attached to the back portion of the vehicle seat;
   said mounting frame including hook means engaging the upright back portion of the vehicle seat to support the frame thereon;
   and a seat structure for a child removably supported on the frame,
   said seat structure having a backrest, a seat portion pivotally connected to the last-mentioned backrest, and means adjustably supporting the last-mentioned seat portion from and at an angle to the backrest of the seat structure to accommodate a child in a sitting position;
   and releasable connecting means supporting the seat structure on the mounting frame and allowing removal of the seat structure from the frame without removing the frame from the vehicle seat.

7. The combination with a vehicle seat having an upright back portion and a generally horizontal seat portion of a child's car seat, including:
   a mounting frame removably attached to the back portion of the vehicle seat;
   said mounting frame including hook means engaging the upright back portion of the vehicle seat to support the frame thereon;
   and a seat structure for a child removably supported on the frame,
   said seat structure having a back portion, a seat portion pivotally connected to the last-mentioned back, and means adjustably supporting the last-mentioned seat portion from and at an angle to the back portion of the seat structure to accommodate a child in a sitting position;
   and releasable connecting means supporting the seat structure on the mounting frame and allowing removal of the seat structure from the frame without removing the frame from the vehicle seat,
   said releasable connecting means including a swing joint and releasable latch means whereby the seat structure is movable relative to the mounting frame to bring the back and seat portions of the seat structure to a position in which they rest upon and are supported by the seat portion of the vehicle seat and are restrained by the mounting frame from lateral movement relative to the vehicle seat.

8. A convertible car seat and bed for a child, comprising:
   a mounting frame including hook means engaging the upright back portion of a vehicle seat to support the frame thereon;
   a seat structure for a child removably supported on the frame;
   releasable interconnecting means supporting the seat structure on the mounting frame and allowing removal of the seat structure from the frame without removing the frame from the vehicle seat,
   said interconnecting means including at least one bracket on the mounting frame receivable in an opening in the seat structure and disengageable by relative upward movement of the seat structure;
   and means restraining said seat structure against said relative upward movement to keep the interconnecting means in engagement.

References Cited by the Examiner

UNITED STATES PATENTS

| | | | |
|---|---|---|---|
| 2,690,787 | 8/1954 | Soltis | 297—255 |
| 2,723,709 | 11/1955 | Welsh | 297—255 |
| 2,731,072 | 1/1956 | Post | 297—255 X |
| 3,000,645 | 9/1961 | Schmidt | 280—38 |
| 3,023,047 | 2/1962 | Linden | 297—254 |
| 3,062,583 | 11/1962 | Hamilton | 297—254 X |
| 3,094,356 | 6/1963 | Burke | 297—254 |
| 3,115,364 | 12/1963 | Berlin | 297—254 X |
| 3,132,895 | 5/1964 | Pollington | 297—250 X |
| 3,132,896 | 5/1964 | Hamilton et al. | 297—256 |

FOREIGN PATENTS

| | | |
|---|---|---|
| 1,123,784 | 6/1956 | France. |
| 516,394 | 1/1940 | Great Britain. |
| 811,559 | 6/1959 | Great Britain. |

FRANK B. SHERRY, *Primary Examiner.*

JAMES T. McCALL, *Examiner.*